United States Patent
Oshima et al.

(10) Patent No.: US 6,904,644 B2
(45) Date of Patent: Jun. 14, 2005

(54) HINGE ASSEMBLY

(75) Inventors: Kazuyoshi Oshima, Naruto-machi (JP); Shinichiro Koshikawa, Yokaichiba (JP); Katsuya Imai, Tako-machi (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 0 days.

(21) Appl. No.: 10/181,917

(22) PCT Filed: Sep. 21, 2001

(86) PCT No.: PCT/JP01/08272

§ 371 (c)(1), (2), (4) Date: Jul. 24, 2002

(87) PCT Pub. No.: WO02/31369

PCT Pub. Date: Apr. 18, 2002

(65) Prior Publication Data

US 2003/0009852 A1 Jan. 16, 2003

(30) Foreign Application Priority Data

Sep. 29, 2000 (JP) ...................... 2000-299501

(51) Int. Cl.⁷ ................................ E05C 1/08
(52) U.S. Cl. .............................. 16/330; 16/303; 16/297
(58) Field of Search .................... 16/277, 297, 319, 16/321, 330, 303

(56) References Cited

U.S. PATENT DOCUMENTS

| | | | | |
|---|---|---|---|---|
| 5,109,571 A | * | 5/1992 | Ohshima et al. | 16/307 |
| 5,600,868 A | * | 2/1997 | Tourville et al. | 16/277 |
| 5,628,089 A | * | 5/1997 | Wilcox et al. | 16/303 |
| 5,704,094 A | * | 1/1998 | Hartigan et al. | 16/303 |
| 6,065,187 A | | 5/2000 | Mischenko | |
| 6,070,298 A | * | 6/2000 | Sorimachi | 16/330 |
| 6,085,387 A | * | 7/2000 | Han | 16/330 |
| 6,115,886 A | * | 9/2000 | Fujita | 16/330 |
| 6,175,990 B1 | | 1/2001 | Kato et al. | 16/334 |
| 6,292,980 B1 | * | 9/2001 | Yi et al. | 16/303 |

FOREIGN PATENT DOCUMENTS

| | | |
|---|---|---|
| DE | 198 58 709 | 6/2000 |
| EP | 0 923 215 | 6/1999 |
| JP | 59-065612 A | 4/1984 |
| JP | 07-011831 A | 1/1995 |
| JP | 09-233165 A | 9/1997 |
| JP | 10-317779 A | 12/1998 |
| JP | 11-50727 A | 2/1999 |
| JP | 11-112630 A | 4/1999 |

* cited by examiner

Primary Examiner—Chuck Y. Mah
Assistant Examiner—Michael J Kyle
(74) Attorney, Agent, or Firm—Brown & Michaels, PC (57) ABSTRACT

A hinge assembly (1) used for a foldable cellular telephone, wherein a pair of abutment members (5, 6) are forcibly rotated by the biasing force of a bias means (7) to a neutral position where the center parts of the projection (54) and the recess (64) of the abutment members are generally aligned with each other in circumferential direction, the projection is brought into contact with the recess at both side parts of the abutment members in circumferential direction when the pair of abutment members are rotated to the neutral position, and the outer surface of the projection and both side surfaces of the recess in circumferential direction should desirably be formed in an arcuate surface and an outwardly projecting arcuate surface, respectively.

1 Claim, 13 Drawing Sheets

HINGE ASSEMBLY

TECHNICAL FIELD

This invention relates to a hinge assembly which is suited to be used for a foldable cellular telephone or the like.

BACKGROUND ART

Figure 18:
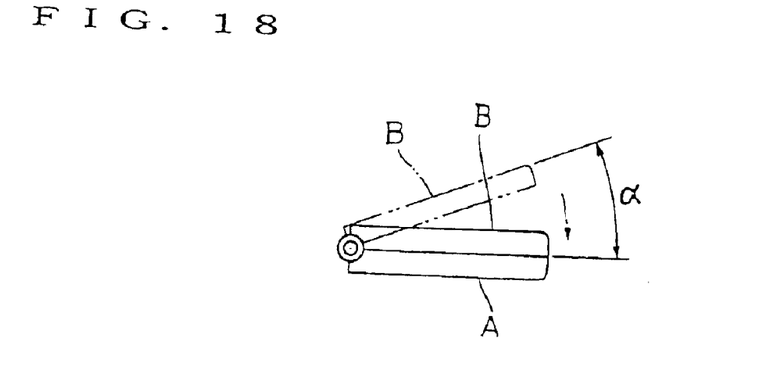
FIG. 18 is a view showing one example of a cellular telephone having a hinge assembly according to the present invention, in which the transmission section and the reception section are turned into the non-talk position.
Figure 19:
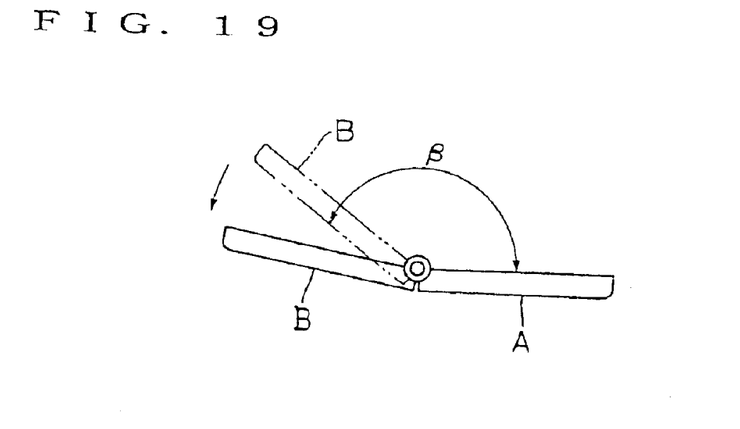
FIG. 19 is a view showing one example of the above cellular telephone, in which the transmission section and the reception section are turned into the talk position.

In general, a foldable cellular telephone includes, as shown in FIGS. 18 and 19, a transmission section A and a reception section B. The transmission section A and the reception section B are turnably connected through a hinge assembly (not shown) for turning between a non-talk position where the transmission section A and the reception section B are abutted with each other as indicated by a solid line of FIG. 18 and a talk position as indicated by a solid line of FIG. 19. Moreover, when the angle formed between the transmission section A and the reception section B is smaller than α, the transmission section A and the reception section B are turned into a non-talk position by bias means built in the hinge assembly and held in that position. When the angle formed between the transmission section A and the reception section B is brought to be larger than a predetermined angle β, the transmission section A and the reception section B are turned into the talk position by bias means and held in that position.

Figure 20:
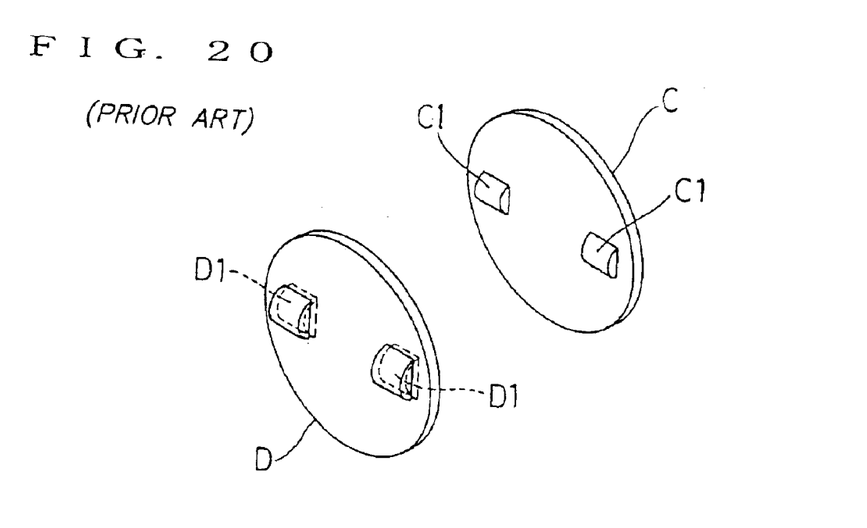
FIG. 20 is a perspective view showing a pair of abutment plates of the conventional hinge assembly.

As shown in FIG. 20, the hinge assembly includes a pair of abutment plates (abutment members) C,D arranged in mutually opposing relation and bias means (not shown) for biasing the paired abutment plates C,D towards each other. The pair abutment plates C,D are non-turnably connected to the transmission section A and the reception section B, respectively. Therefore, the abutment plates C,D are relatively turned as the transmission section A and the reception section B are turned.

The abutment plate C has a pair of projections C1, C1 which are formed on its opposing surface with respect to the abutment plate D and which are arranged 180 degrees away from each other in the circumferential direction. The remaining abutment plate D also has a pair of recesses D1, D1, which are formed on its opposing surface with respect to the abutment plate C and which are arranged 180 degrees away from each other in the circumferential direction. The projection C1 and the recess D1 retain the transmission section A and the reception section B in a non-talk position or in a talk position with the help of the biasing force of the bias means.

Figure 21:
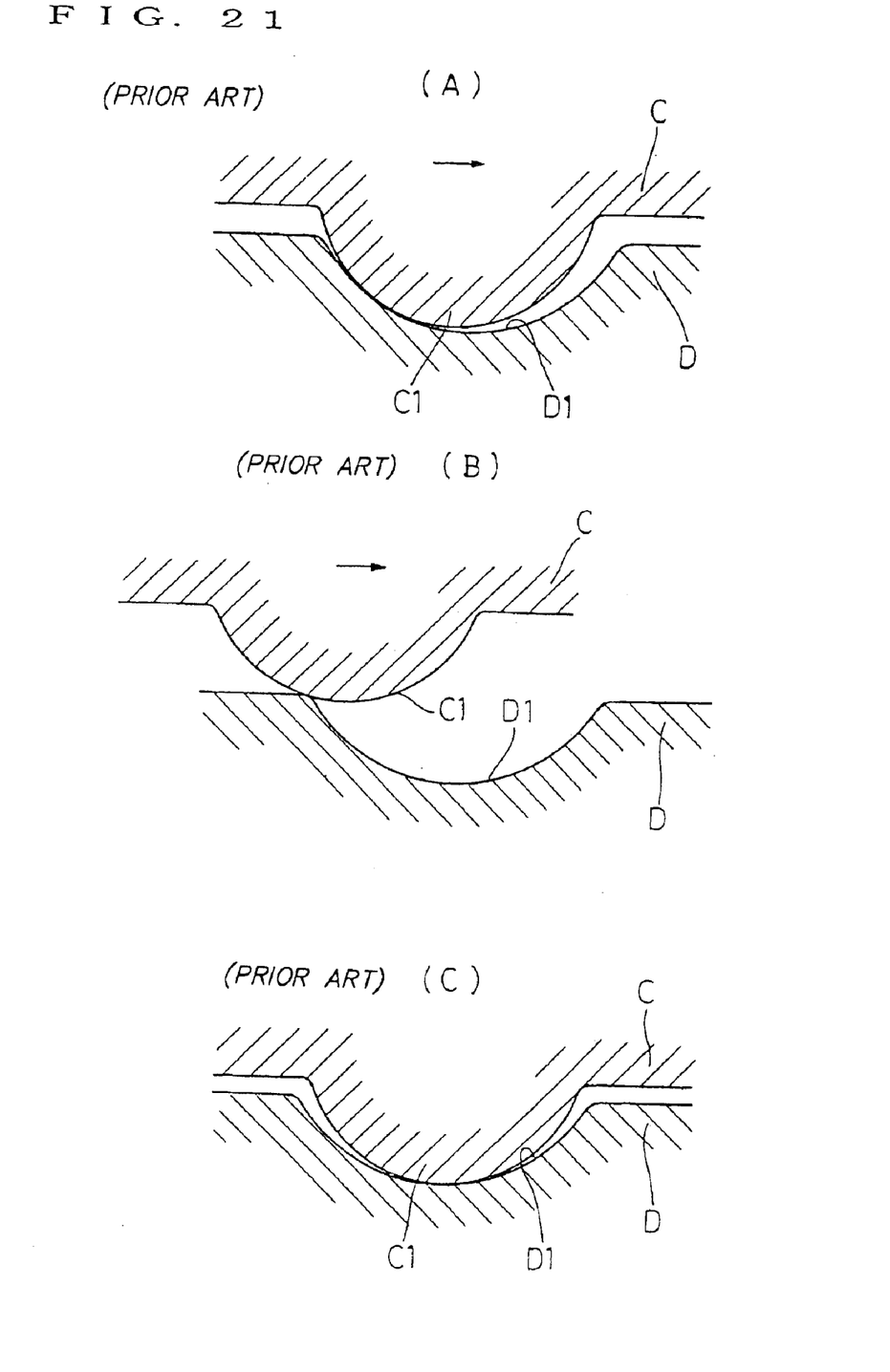
FIG. 21 is an enlarged sectional view showing a relation between the projection and recess formed on the pair of abutment plates shown in FIG. 20.

Specifically, as shown in FIG. 21, the projection C1 and the recess D1 are arcuate in section. When the transmission section A and the reception section B are in the non-talk position, the projection C1 and the recess D1 are, as shown in FIG. 21(A), abutted with each other at areas which are slightly circumferentially away from their centers. Owing to this arrangement, the biasing force of the bias means is converted into a rotational biasing force (rotation biasing force for turning the abutment plate D in a direction opposite to the arrowed direction) for turning the abutment plate C in the arrowed direction. By this rotational biasing force, the transmission section A and the reception section B are held in the non-talk position. As shown in FIG. 21(B), when the angle formed between the transmission section A and the reception section B is β or less, an area which is slightly away from the central part of the projection C1 contact one end portion of the recess D1. By this, the abutment plate C is biased in the arrowed direction of FIG. 21(B) and the transmission section A an the reception section B are turned in the non-talk position. When the angle formed between the transmission section A and the reception section B is β or more, the projection C1 and the recess D1 are brought into a symmetrical state with respect to the state shown in FIG. 21(B). Accordingly, the abutment plate C is biased in a direction opposite to the arrowed direction and the transmission section A and the reception section B are turned as far as to the talk position. When the transmission section A and the reception section B are located in the talk position, the projection C1 and the recess D1 are press-contacted at their central areas with each other as shown in FIG. 21(C). In that connection, the biasing force of the bias means merely urges the projection C1 against the bottom surface of the recess D1 and is never converted into a rotational biasing force. However, when the abutment members C,D are turned into either one direction from the position (hereinafter referred to as the "neutral position") shown in FIG. 21(C), the biasing force of the bias means is converted into a rotational biasing force and causes the abutment members C,D to return into the neutral position. Accordingly, the transmission section A and the reception section B are held in the talk position.

In the above hinge assembly, when the abutment members C,D are turned, even if slightly, from the neutral position, the biasing force of the bias means should, theoretically, be converted into a rotational biasing force for returning the abutment members C,D to the neutral position. Actually, however, since the nearby areas (central areas of the projection C1 and the recess D1 in the circumferential direction of the abutment members C,D) of the contact points between the projection C1 and the recess D1 in the neutral position are generally orthogonal to the biasing direction of the bias means, the biasing force of the bias means is hardly converted into the rotational biasing force in the position where the abutment members C,D are slightly turned from the neutral position, and the abutment members C,D are not returned to the neutral position. For this reason, the transmission section A and the reception section B are not positioned in the talk position with a decent degree of modesty. This results in a problem that play is liable to occur.

DISCLOSURE OF THE INVENTION

In order to solve the above problem, the features of the present invention reside in a hinge assembly comprising a pair of abutment members arranged in mutually opposing relation and capable of making relative rotation, and bias means for biasing the pair of abutment members, so as to be press contacted with each other, one of the pair of abutment members having a projection formed on an opposing surface thereof and extending radially of the abutment member, the other abutment member having a recess formed on an opposing surface thereof and allowing the projection to be brought therein and thereout in accordance with the relative rotation of the their abutment members, when the projection is brought into the recess, the pair of abutment members being forcibly turned to a neutral position, side view where central areas of the projection and recess in a circumferential direction of the abutment members are generally coincident with each other, the hinge assembly being characterized in that when the pair of abutment members are turned into the neutral position, the projection being brought into contact with the recess at opposite side portions in a circumferential direction of the member.

It is preferred that an outer surface of the projection is defined by an arcuate surface extending in a radial direction of the abutment member.

It is also preferred that opposite side surfaces of the recess in the circumferential direction of the abutment member is defined by an outwardly projecting arcuate surface.

BRIEF DESCRIPTION OF DRAWINGS

FIG. 7(A) is a front view, FIG. 7(B) is a right side view, FIG. 7(C) is a plan view, FIG. 7(D) is a lower surface view, and FIG. 7(E) is a front sectional view thereof.

FIG. 8(A) is a front view, FIG. 8(B) is a right side view, FIG. 8(C) is a plan view, FIG. 8(D) is a lower surface view, and FIG. 8(E) is a side sectional view thereof.

FIG. 9(A) is a front view, FIG. 9(B) is a right side view, FIG. 9(C) is a plan view, FIG. 9(D) is a lower surface view, and FIG. 9(E) is a front sectional view thereof.

FIG. 10(A) is a front view, FIG. 10(B) is a right side view, FIG. 10(C) is a front sectional view, FIG. 10(D) is a lower surface view thereof

FIG. 21(A) shows a state in which the transmission section and the reception section are turned in the non-talk position, FIG. 21(B) shows a state in which the transmission section and the reception section are turned by an angle a from the non-talk position, and FIG. 21(C) shows a state in which the transmission section and the reception section are turned into the talk position.

BEST MODE FOR CARRYING OUT THE INVENTION

One mode for carrying out the invention, in which the invention is incorporated with a hinge assembly used for a foldable cellular telephone, will be described herein after with reference to FIGS. 1 through 16. It should be noted, however, the present invention can be applied to other hinge assemblies than a hinge assembly used for a foldable cellular telephone, inasmuch as those hinge assemblies are used for turnably connecting two turning members.

As shown in FIGS. 1 through 6, a hinge assembly 1 includes first and second fixed members 2,3, a hinge pine 4, a movable disc (abutment member) 5, a fixed disc (abutment member) 6 and a coiled spring (bias means) 7. Those components 2 through 7 are arranged with their axes aligned.

As shown in FIGS. 1 through 6 and FIG. 7, the first fixed member 2 has a bottom portion 21 at one end portion thereof and is open at the other end portion, thus exhibiting a cylindrical configuration with a bottom. The first fixed member 2 is non-turnably connected to one of the transmission section A and the reception section B with its axis aligned with the rotation axes of the transmission section A and the reception section B. A through hole 22 is formed in a central area of the bottom portion 21. A pair of guide grooves 23, 23 axially extending from the open end face is formed in the open end portion side of a peripheral wall portion of the first fixed member 2, The pair of guide grooves 23, 23 are 180 degrees away from each other in the circumferential direction.

The second fixed member 3 is non-turnably connected to the other of the transmission section A and the reception section B in such a manner as to be in opposing relation to the first fixed member. As shown in FIGS. 1 through 6 and FIG. 8, a receiving recess 31 is formed in an opposing surface of the second fixed member 3 with respect to the first fixed member 2. A through hole 32 is formed in a central area of the second fixed member 3.

Figure 6:
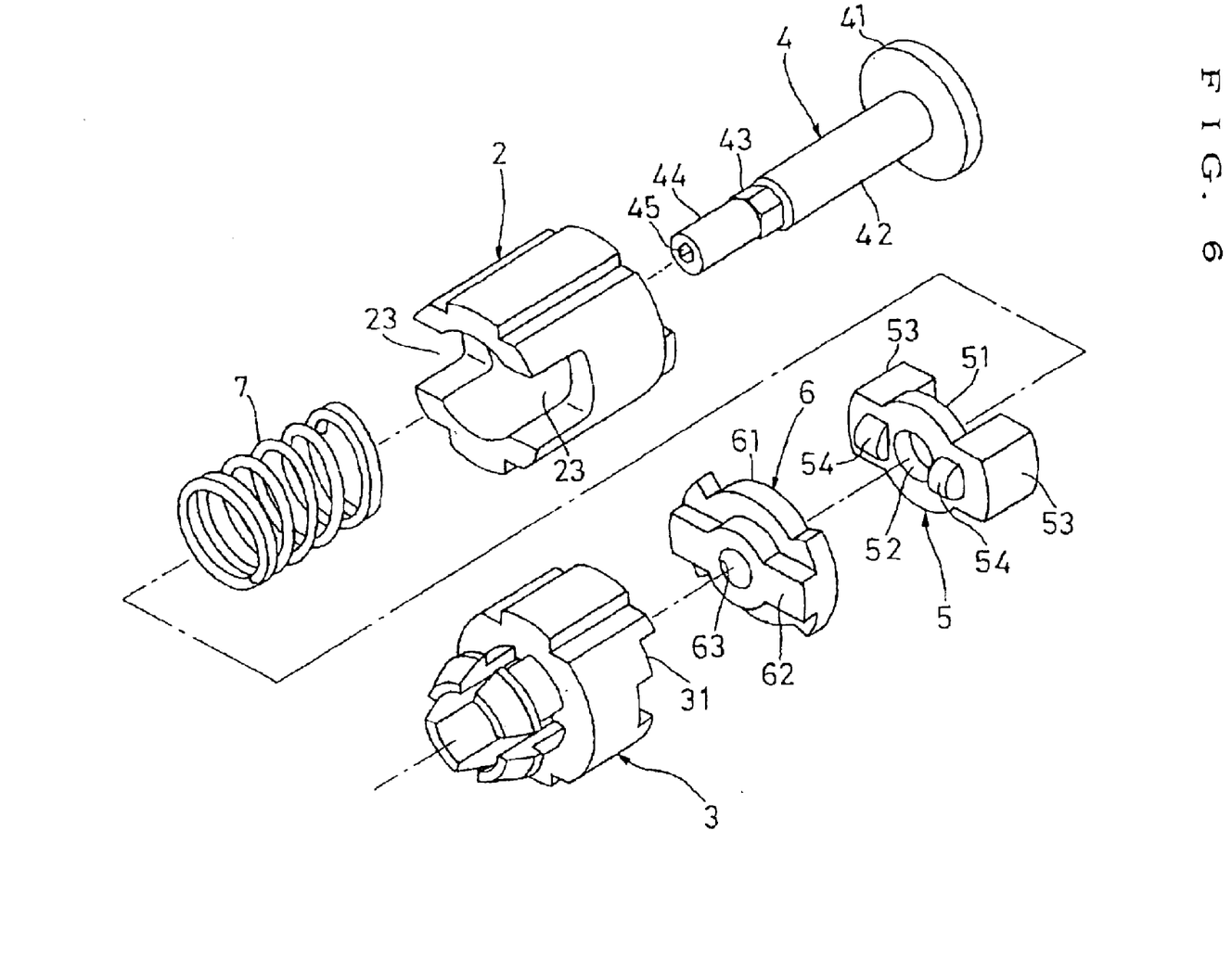
FIG. 6 is an exploded perspective view of the above mode.
Figure 7:
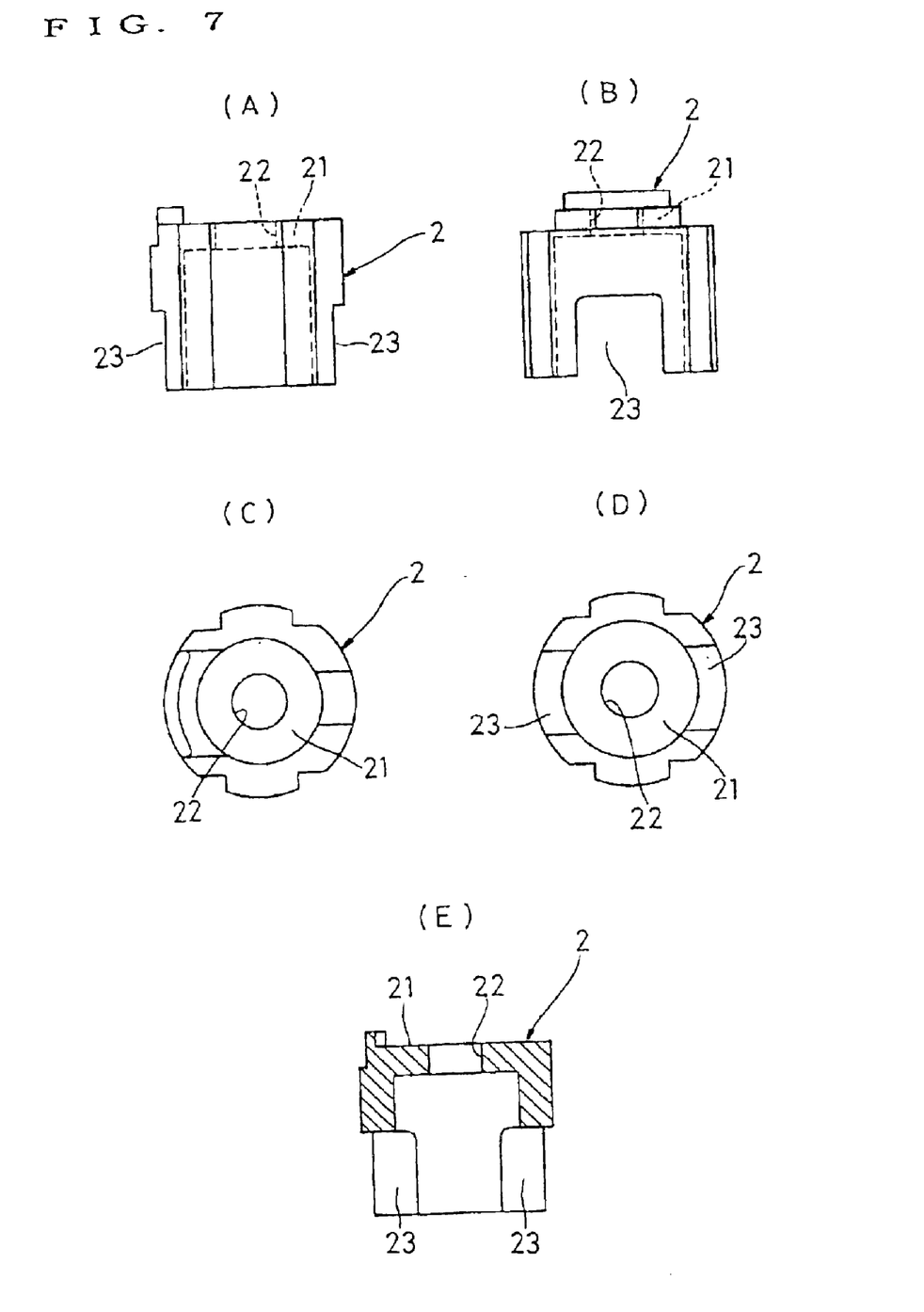
FIG. 7 is an illustration showing a first fixing member used in the above mode.
Figure 8:
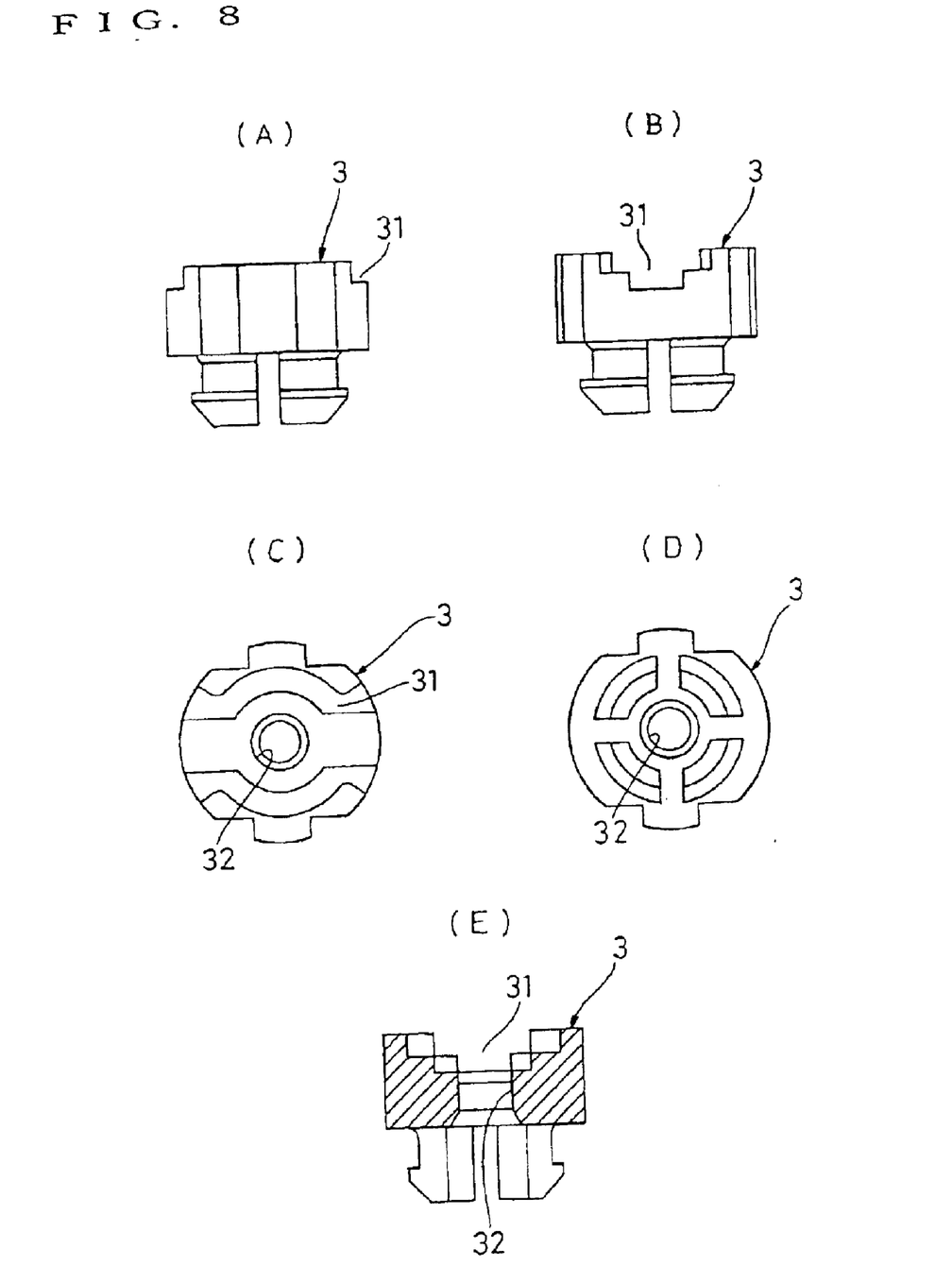
FIG. 8 is an illustration showing a second fixing member used in the above mode.

As shown in FIG. 6, the hinge pin 4 includes a head portion 41, an enlarged diameter portion 42, a sectionally hexagonal fixed portion 43, and a reduced diameter portion 44, which are all arranged in order from one end portion thereof towards the other end portion. Those components 41 through 44 are formed such that their axes are aligned with one another. The enlarged diameter portion 42 is inserted into the through hole 22 until the head portion 41 hits the bottom portion 21 of the first fixed member 2. The enlarged diameter portion 42 is turnably fitted to the through hole 22. The reduced diameter portion 44 is inserted into the through hole 32 of the second fixed member 3. After insertion, the second fixed member 3 is positionally fixed to the reduced diameter portion 44 by caulking the reduced diameter portion 44 utilizing a caulking hole 45 formed in a distal end face of the reduced diameter portion 45 so that the reduced diameter portion 44 is enlarged in diameter. The outside diameter of the reduced diameter portion 44 has a generally same diameter as a circle inscribing the hexagon which constitutes the fixed portion 43.

As shown in FIGS. 1 through 6 and FIG. 9, the movable disc 5 includes a disc-like substrate portion 51. This substrate portion 51 is axially movably inserted into the end portion on the open end portion side of the first fixed member 2. A through hole 52, into which the enlarged diameter portion 42 of the hinge pin 4 is relatively turnably and relatively movably inserted, is formed in a central area of the substrate portion 51. A pair of guide portions 53, 53 are formed on the one and the other side portions of the substrate portion 51. The movable disc 5 is axially movably but non-turnably connected to the first fixed member 2 by slidingly movably fitting the pair of guide portion 53, 53 to the guide grooves 23, 23 of the first fixed member 2. Between the substrate portion 51 of the movable disc 5 and the bottom portion 21 of the first fixed member 2, the coiled spring 7 is disposed in its compressed state. The movable disc 5 is biased towards the second fixed member 3 side by the coiled spring 7.

As shown in FIGS. 1 through 6 and FIG. 10, the fixed disc 6 includes a disc-like substrate portion 61 and a ridge 62 formed on a lower surface (surface on the reverse side of the movable disc 5 side) of the substrate portion 61. The fixed disc. 6 is, as a whole, formed in a generally same configuration as the receiving recess 31. The fixed disc 6 is fitted to the receiving recess 31, thereby the fixed disc 6 is non-turnably connected to the second fixed member 3. A through-hole 63 is formed in a central area of the fixed disc 6. This through hole 63 has an inside diameter generally equal to the outside diameter of the reduced diameter portion 44 of the hinge pin 4. A sectionally hexagonal fixed portion 43 is fixedly press fitted to the through hole 63. By this, the fixed disc 6 and the second fixed member 3 are connected to the hinge pin 4 such that they are rotated in unison. This hinge pin 4 is not absolutely necessarily connected to the second fixed member 3 and the fixed disc 6 such that they are rotated in unison. The hinge pin 4 may be connected to the first fixed member 2 and the movable disc 5 such that they are rotated in unison. Alternatively, the hinge pin 4 may be connected to the first and second fixed members 2,3, the movable disc 5 and the fixed disc 6 so that they can all rotate.

Figure 1:
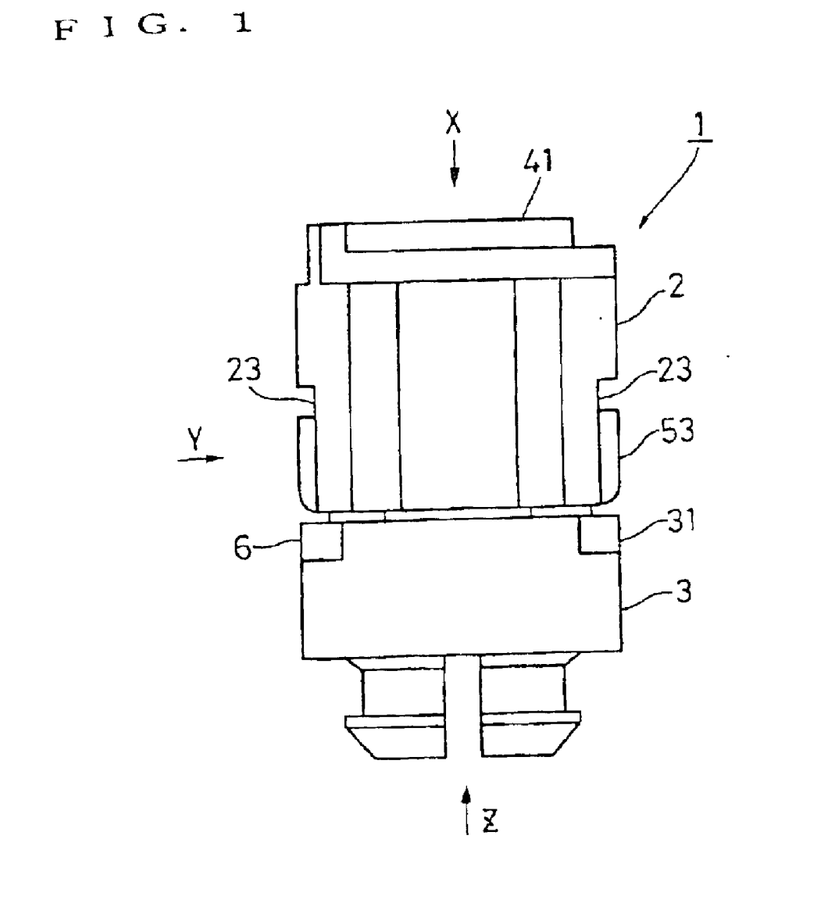
FIG. 1 is a front view showing one mode for carrying out the present invention.
Figure 2:
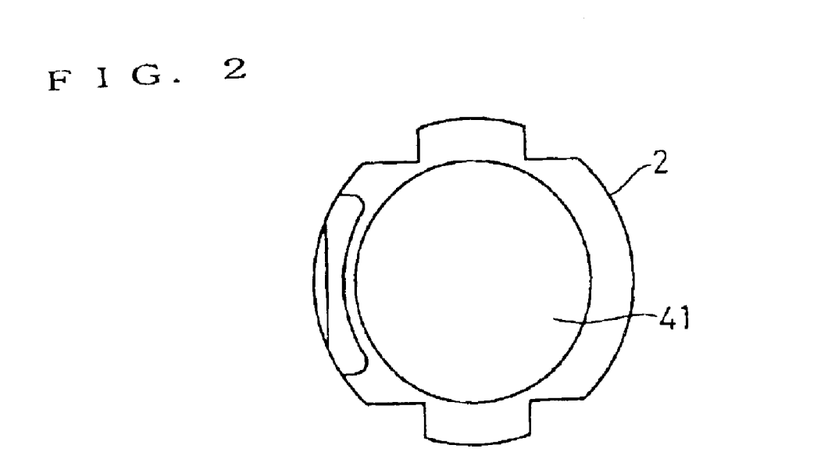
FIG. 2 is an illustration as viewed in a direction as indicated by an arrow X of FIG. 1.
Figure 3:
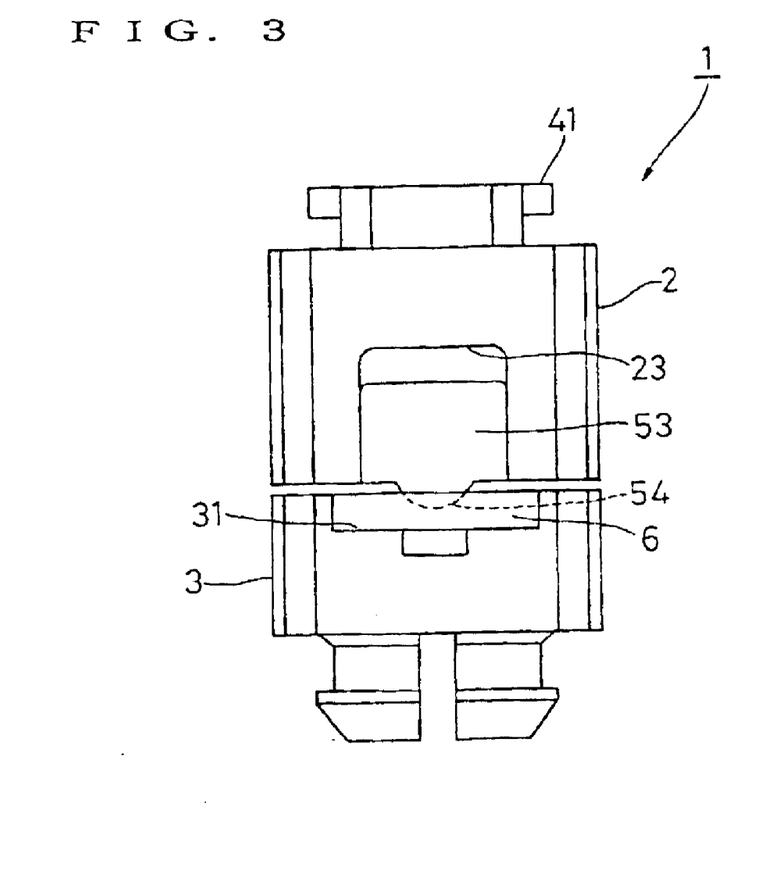
FIG. 3 is an illustration as viewed in a direction as indicated by an arrow Y of FIG. 1.
Figure 4:
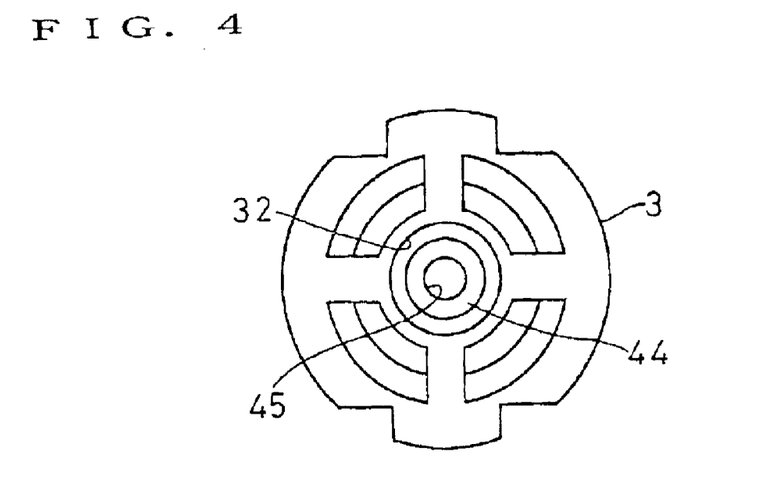
FIG. 4 is an illustration as viewed in a direction as indicated by an arrow Z of FIG. 1.
Figure 5:
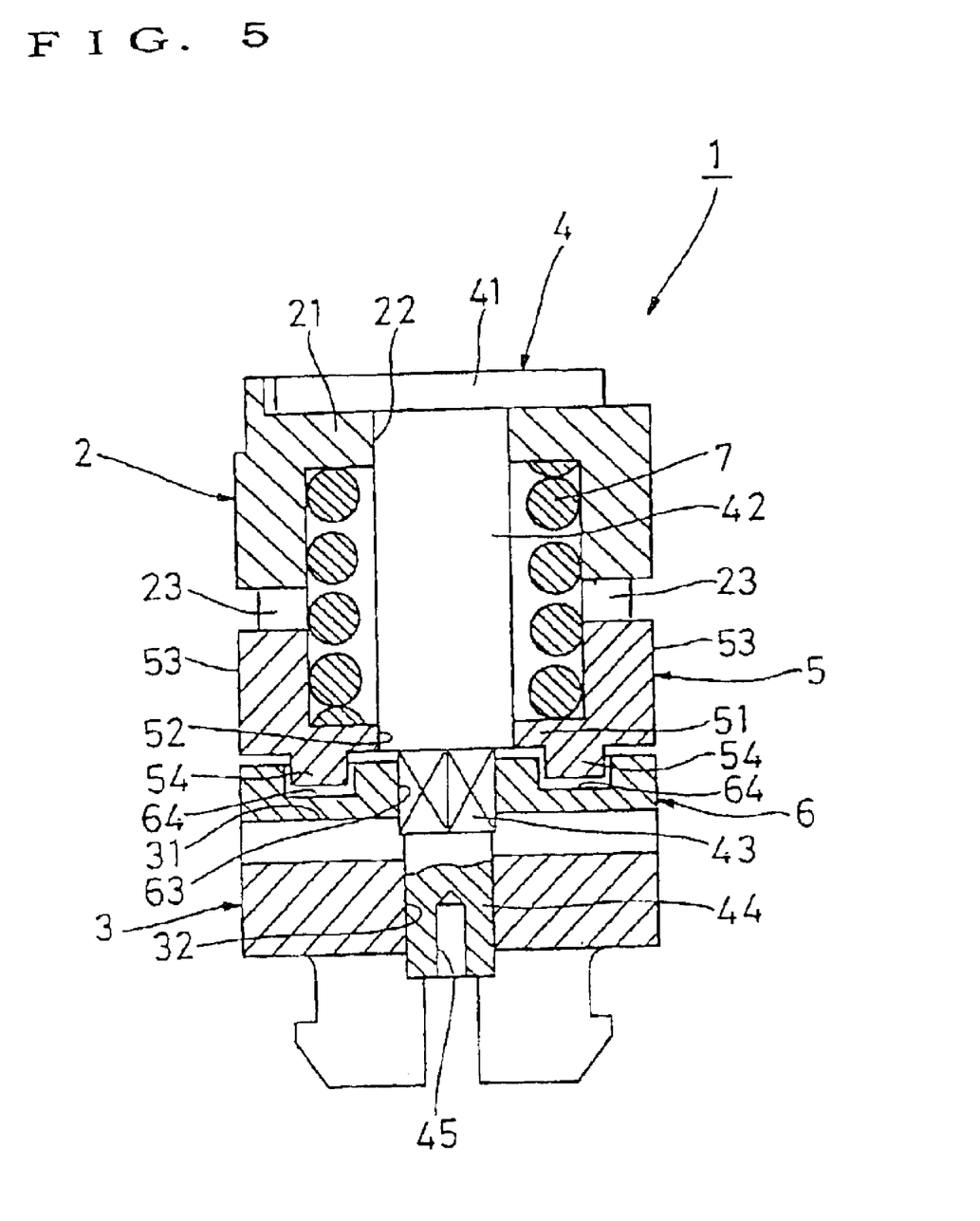
FIG. 5 is a front sectional view of the above mode.
Figure 9:
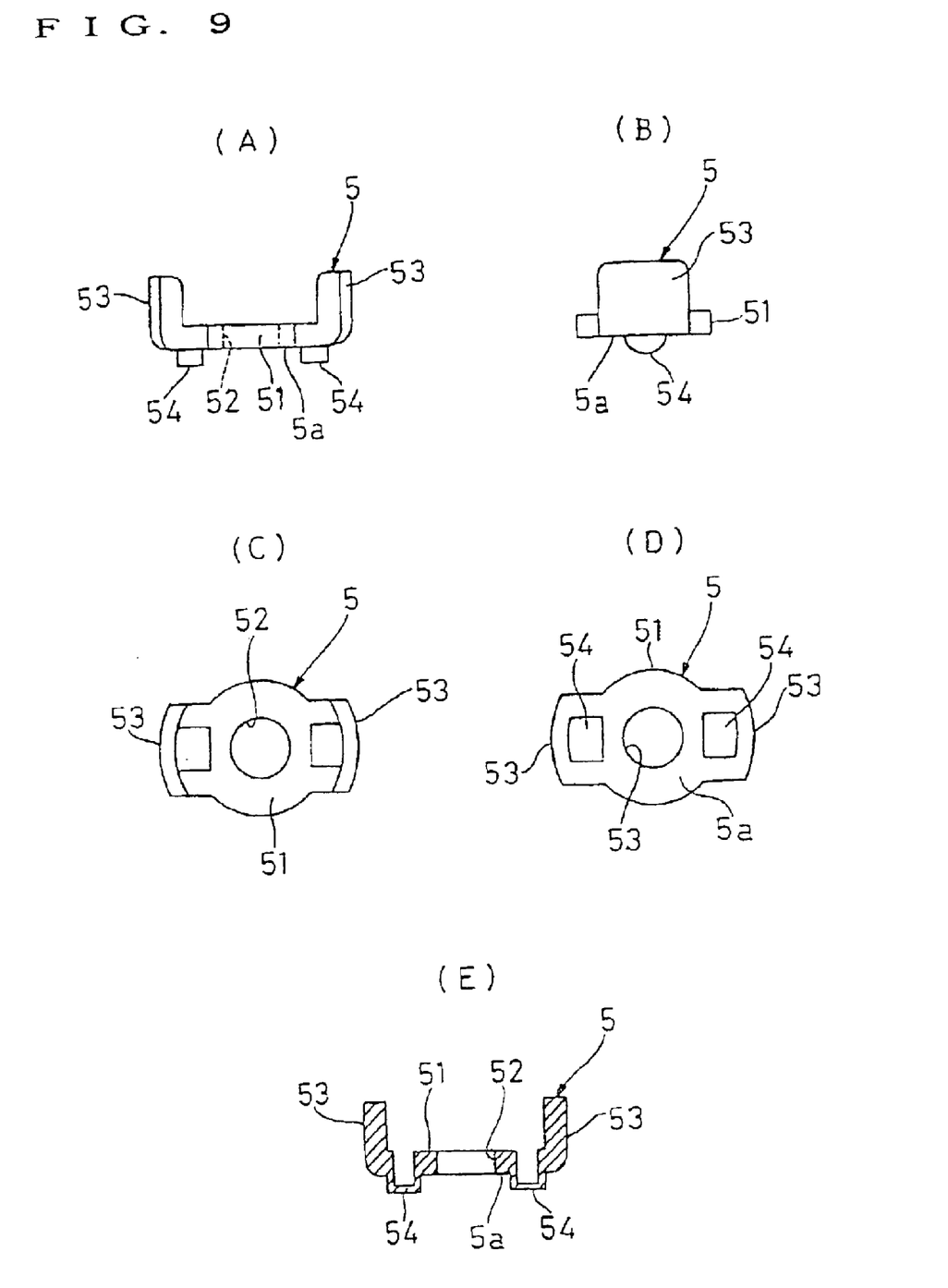
FIG. 9 is an illustration showing a movable disc used in the above mode.
Figure 10:
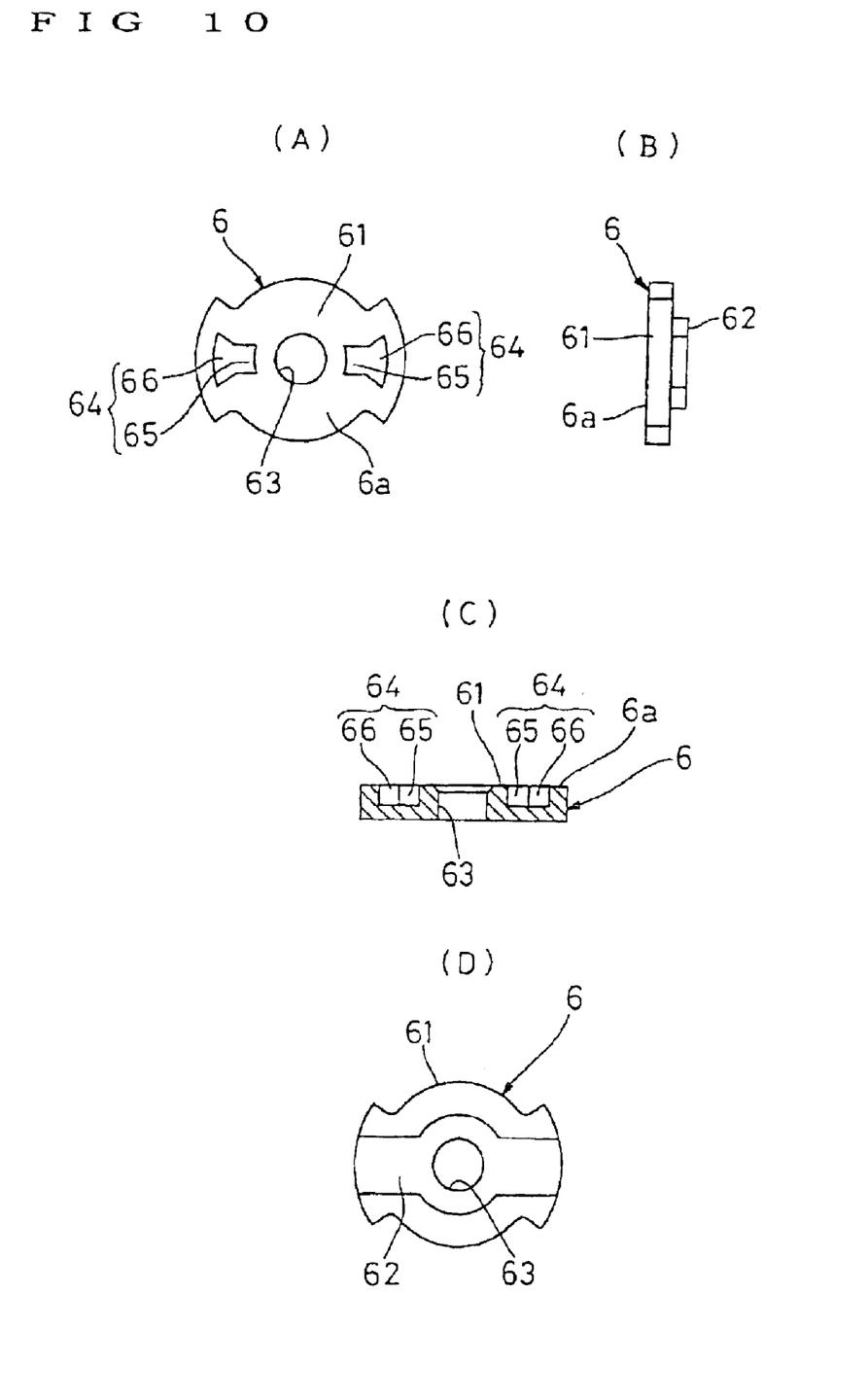
FIG. 10 is an illustration showing a fixed disc used in the above mode.

The fixed disc 6 is received by the second fixed member 3 in the direction towards the second fixed member 3 side from the first fixed member 2 side. Accordingly, the opposing surface 5a of the movable disc 5 is pressed against the opposing surface 6a of the fixed disc 6 by the coiled spring 7. As shown in FIGS. 5, 6 and 9, a pair of projections 54, 54 are formed on the opposing surface 5a of the movable disc 5 such that the projections 54, 54 are arranged 180 degrees away from each other on a circumference about the axis of the movable disc 5. On the other hand, a pair of recesses 64, 64 are formed on the opening surface 6a of the fixed dis6 such that the recesses 64, 64 are 180 degrees away from each other in the circumferential direction, as shown in FIGS. 5, 6 and 10. The recess 64 is arranged on the same circumference as the projection 54. Moreover, the length of the recess 64 in the radial direction of the discs 5, 6 is longer than that of the projection 54 in that direction.

Figure 11:
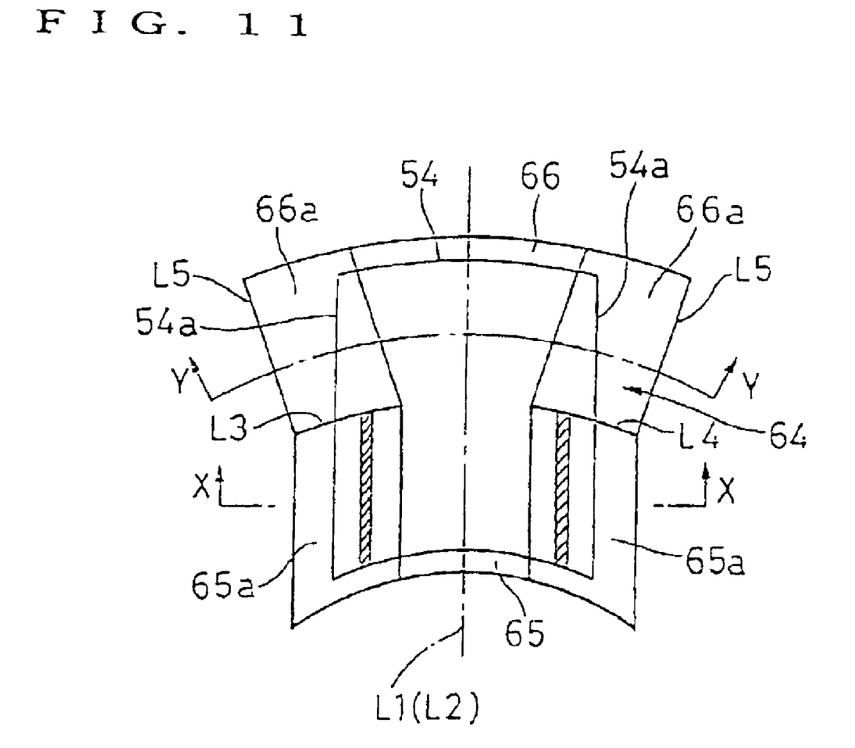
FIG. 11 is a plan view showing a relation between a recess and a projection when the movable disc and the fixed disc are returned into the neutral position.
Figure 12:
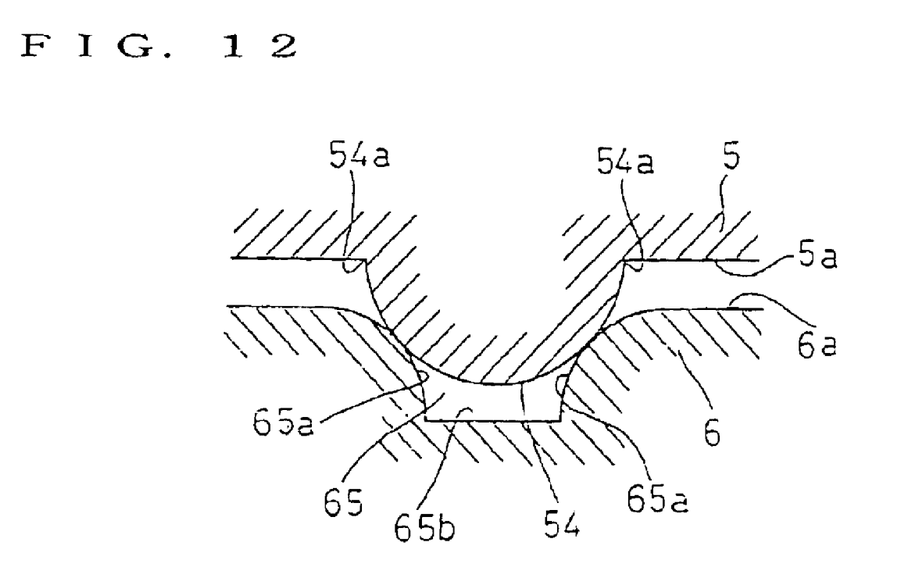
FIG. 12 is a sectional view taken on line X—X of FIG. 11.

As shown in FIGS. 11 and 12, the projection 54 is extended in the radial direction of the movable disc 5 with a predetermined width. The center line L1 in the width direction is orthogonal to the axis of the movable disc 5. The outer surface of the projection 54 is defined by an outwardly projecting arcuate surface, and the center line of this arcuate surface is, when viewed in the axial direction of the movable disc 5, aligned with the center line L1. Accordingly, the projection 54 is symmetrical with respect to the center line L1. Its sectional configuration orthogonal to the center line L1 is same, in any section. As a result, the projection 54 exhibits a square configuration, in which crossing ridge lines 54a, 54a between the projection 54 and the opposing surface 5a of the movable disc 5 is, when viewed in the axial direction of the movable disc 5, parallel to the center line L1.

The recess 64 comprises an inner recess 65 formed on the inner side in the radial direction of the fixed disc 6 and an outer recess 66 formed on the outer side in the radial direction.

The inner recess 65 is extended in the radial direction of the fixed disc 6 with a predetermined width. The center line L2 in its width direction is orthogonal to the axis of the fixed disc 6. The sectional configuration orthogonal to the center line L2 of the inner recess 65 is same in any section. Moreover, the inner recess 65 is symmetric with respect to the center line L2. Opposite side surfaces 65a, 65a (opposite side surfaces located in the circumferential direction of the fixed disc 6) of the inner recess 65 are defined by an outwardly projecting convexly curved surface. Especially, in this mode for carrying out the present invention, they are defined by an arcuate surface and the center of the arcuate surface is parallel to the center line L2. Moreover, one end portion of this arcuate surface is in contact with the opposing surface 6a.

On the other hand, the outer recess 66 is formed in a sector-like configuration which is gradually increased in width towards the outer periphery side from the inner periphery side of the fixed disc 6 when viewed in the axial direction of the fixed disc 6. The width of the inner periphery side end portion of the outer recess 66 is equal to the width of the inner recess 65. The outer recess 66 is also symmetric with respect to the center line L2. Its side surface 66a is defined by an arcuate surface having a generally same radius of curvature as the arcuate surface which defines the side surface 65a. One end portion of the arcuate surface which defines the side surface 66a is also in contact with the opposing surface 6a. The arcuate surface which defines the side surface 66a and the arcuate surface which defines the side surface 65a are crossed with each other without leaving any step therebetween. The crossing ridge lines are denoted by reference numeric characters L3, L4 of FIG. 11. The line L5 connecting contact areas between the side surface 66a and the opposing surface 6a is orthogonal to the axis of the fixed disc 6. Accordingly, the center line of the arcuate surface which defines the side surface 66a, is parallel to the line L5 but never crossed with the axis of the fixed disc 6. The center line of the arcuate surface which defines the side surface 66a may be orthogonal to the axis of the fixed disc 6. In that case, the line L5 is not orthogonal to the axis of the fixed disc 6.

The relation between the projection 54 and the inner and outer recesses 65, 66 will now be described. As shown in FIG. 11, when the transmission section A and the reception section B of the cellular telephone are located in the talk position, the center lines L1, L2 are aligned with each other when viewed in the direction of the axes of the discs 5, 6. The position of the movable disc 5 and the fixed disc 6 at that time is the neutral position.

Figure 13:
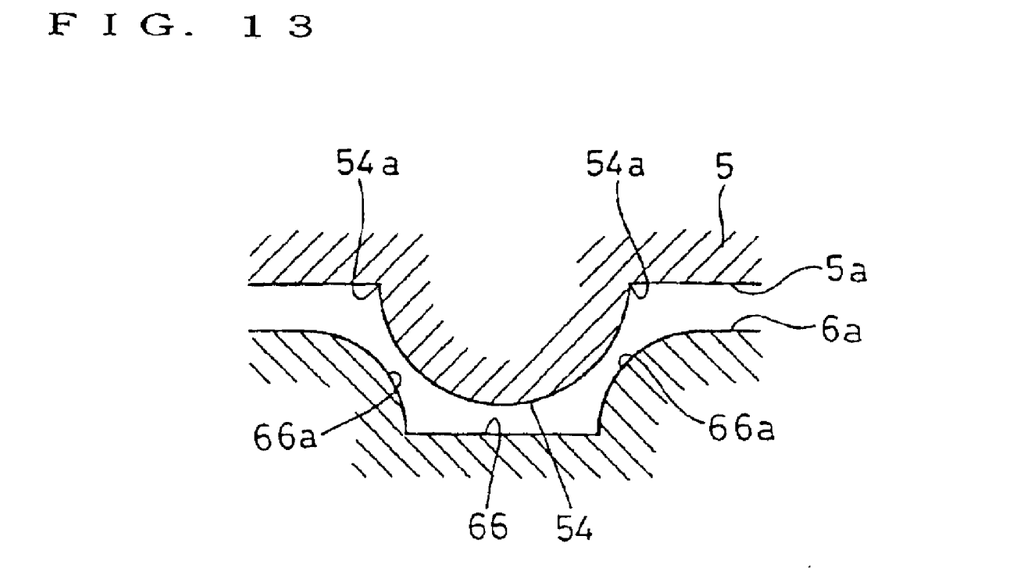
FIG. 13 is a sectional view taken on line Y—Y of FIG. 11.

In the state in which the movable disc 5 and the fixed disc 6 are located in the neutral position, the central area of the projection 54 is, as shown in FIG. 12, away from the bottom surface 65b of the inner recess 65 and only the opposite side portions of the projection 54 are in contact with the opposite side surfaces 65a, 65a of the inner recess 65. Moreover, since the center line L1 of the projection 54 and the center line of the arcuate surface which defines the side surface 65a of the inner recess 6 are parallel to each other, the projection 54 and the side surface 65a are in line contact (substantially in surface contact) as indicated by hatching of FIG. 11. On the other hand, since the outer recess 66 is increased in width as it goes outward away from the inner recess 65, the projection 54 is, as shown in FIG. 13, is away from not only the side surface 66a of the outer recess 66 but also any surface which defines the outer recess 66.

Figure 14:
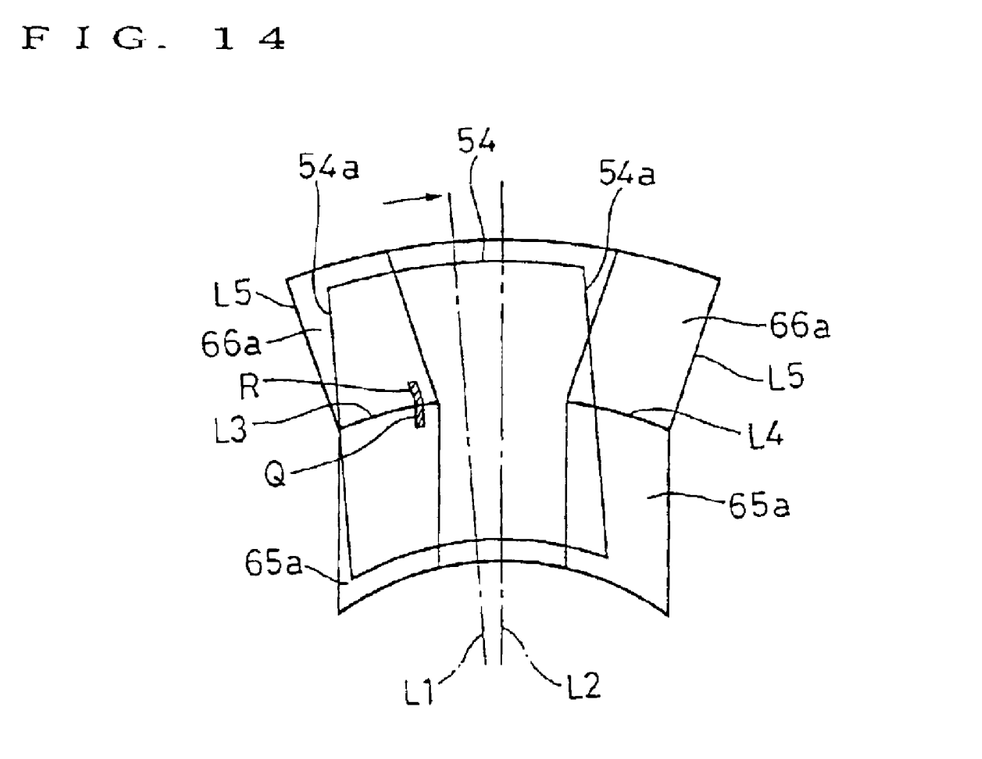
FIG. 14 is a plan view showing a relation between a recess and a projection when the movable disc and the fixed disc are slightly turned from the neutral position.

When the two discs 5, 6 are turned from the neutral position of FIGS. 11 and 12 within a range of a smaller angle than an angle α1, the projection 54 is brought into contact, as indicated by hatching of FIG. 14, with an end portion of the outer periphery side of the side surface 65a of the inner recess, 65 and an end portion of the inner side of the side surface 66a of the outer recess 66. It should be noted, however, that when the transmission section A and the reception section B are turned from the neutral position by an angleα, the center line L1 and the line L5 are aligned with each other when viewed in plan view. As a result, the central area of the projection 54 is brought into line contact with the side surface 65a (opposing surface 6a) on the line L5.

When the angle formed between the transmission section A and the reception section B is brought to be larger than β, a state symmetric with the state of FIG. 14 is realized.

In the hinge assembly 1 thus constructed, since the projection 54 and the inner recess 65 of the recess 64 are contacted with each other at two areas away in the circumferential direction of the discs 5, 6 when the transmission section A and the reception section B are turned into the talk position and the movable disc 5 and the fixed disc 6 are brought into the neutral position, the movable disc 5 and the fixed disc 6 can be positionally fixed with a decent degree of modesty. Accordingly, the transmission section A and the reception section B can surely be prevented from getting clattering in the talk position.

Moreover, in the hinge assembly 1 according to this mode for carrying out the present invention, since the recess 64 comprises a square inner recess 65 and a sector-like outer recess 66, the projection 54 and the recess 64 can be prevented from getting worn off soon. That is, if the inner recess 65 should be extended towards the outer periphery side and the entire recess 64 should comprise of the inner recess 65, the projection 54 and the side surface of the recess 64 would contact only at the end portion on the outer periphery side when the movable disc 5 should be moved, even slightly, from the neutral position with respect to the fixed disc 6. For this reason, the projection 54 and the recess 64 are readily worn off soon.

On the other hand, in the hinge assembly 1 in which the recess 64 comprises the square inner recess 65 and the sector-like outer recess 66, when the movable disc 5 is turned from the neutral position, an intermediate portion of the projection 54 in the radial direction of the movable disc 5 is brought into contact at an end portion Q on the outer periphery side with the side surface 65a of the inner recess 65 as indicated by hatching of FIG. 14. The same is true with respect to the case where the entire recess 64 comprises only the inner recess 65. However, in this hinge assembly1, the recess 64 includes the outer recess 66, and the intermediate area of the projection 54 is contacted with the side surface 66a of the outer recess 66 also at its inner end portion R. Accordingly, the contact area between the projection 54 and the recess 64 is increased twice. Hence, the projection 54 and the recess 64 can be prevented from getting worn off soon.

Figure 15:
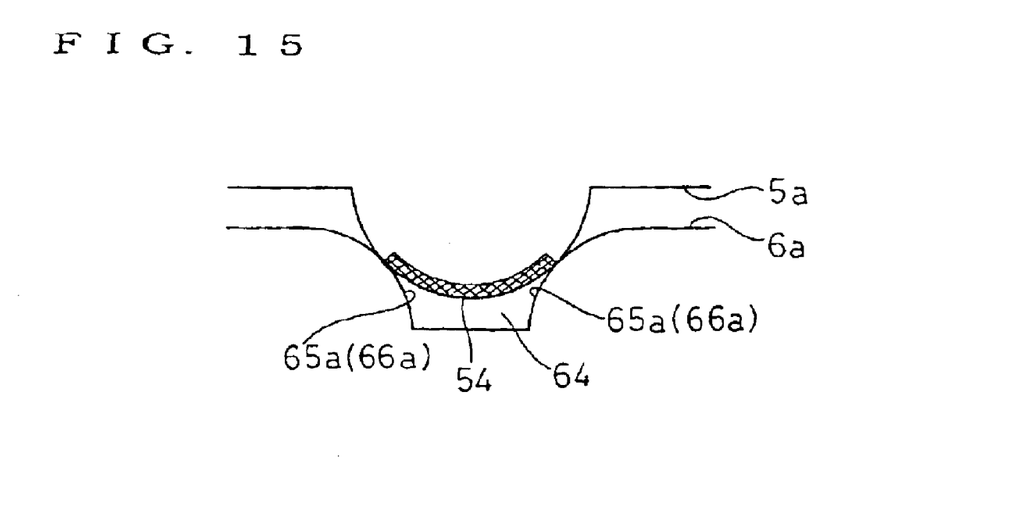
FIG. 15 is a view showing a contact range of a projection with respect to a recess according to the present invention.
Figure 16:
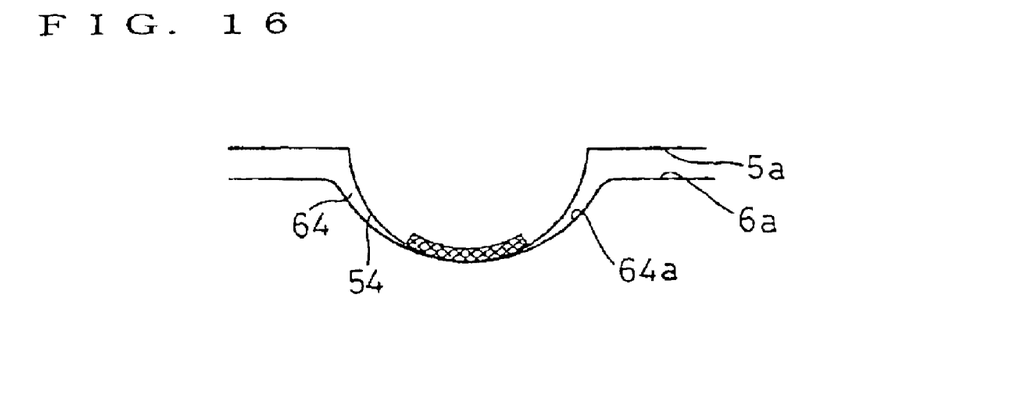
FIG. 16 is a view showing a contact range of a projection with respect to a recess according to the prior art.

As apparent from FIGS. 15 and 16, in the case where the side surfaces 65a, 66a of the recess 64 comprises the outwardly projected arcuate surface as in this hinge assembly 1, the length of the contact area (area indicated by double hatching of FIG. 15) of the projection 54 with respect to the side surfaces 65a, 66a of the projection 54 when the movable disc 5 and the fixed disc 6 are turned, is larger than the length of the contact area (area indicated by double hatching of FIG. 16) in the case where the bottom surface 64a, which defines the recess 64, comprises a concavely curved surface. By this, the projection 54 can more effectively be prevented from getting off soon.

It should be noted that the present invention should never be limited to the above-mentioned mode for carrying out the present invention. Instead, many changes and modifications can be made in accordance with necessity.

For example, in the above-mentioned mode for carrying out the present invention, although the recess 64 comprises the inner recess 65 and the outer recess 66, it is also accepted that the inner recess 65 is extended outward at the outer recess and the entire recess 64 comprises the inner recess 65.

Figure 17:
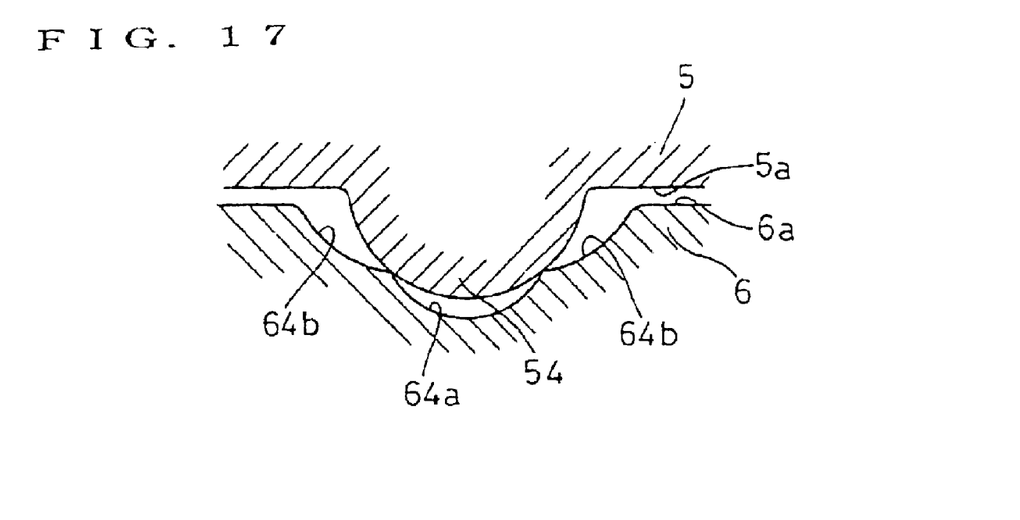
FIG. 17 is a sectional view, like FIG. 12, showing another mode for carrying out the present invention.

As shown in FIG. 17, it is also accepted that the surface, which defines the recess 64, comprises the concavely curved surface 64a at the width-wise central area and concavely curved surface 64b on the opposite sides. In this case, the concavely curved surface 64a comprises an arcuate surface having a smaller radius of curvature than the arcuate surface which defines the projection 54, so that the projection 54 can contact the recess 64 at two areas which are away from each other in the circumferential direction when the movable disc 5 and the fixed disc 6 are turned into the neutral position. The concavely curved surface 64b comprises an arcuate surface having a larger radius of curvature than the arcuate surface which defines the projection 54. With respect to the construction in which the recess 64 comprises only one concavely curved surface 64a on the center side and two concavely curved surface 64b on the width-wise opposite sides, the same is applicable to the recesses 65, 66 in which the recess 64 is divided into the inner recess 65 and the outer recess 66.

Moreover, in the above-mentioned mode for carrying out the present invention, one pair of projections 54 and one pair of recesses 64 are arranged in such a manner as to be 180 degrees away from each other in the circumferential direction. It is also accepted, as in Japanese Patent Application Unexamined Publication No. H10-317779 (especially FIG. 12), that a pair of projections 54 are arranged at an angle less than 180 degrees, for example, about 160 degrees, and three recesses 64 are formed and arranged in a pattern of "Y".

INDUSTRIAL APPLICABILITY

A hinge assembly according to the present invention can be used as a hinge assembly for turnably connecting two goods, such as, a main body and a cover of a cellular telephone or the like.

What is claimed is:

1. A hinge assembly comprising a pair of abutment members arranged in mutually opposing relation and capable of making relative rotation, and bias means for biasing said pair of abutment members, so as to be press contacted with each other, one of said pair of abutment members having a projection formed on an opposing surface thereof and extending radially of said abutment member, the other abutment member having a recess formed on an opposing surface thereof and allowing said projection to be brought therein and thereout in accordance with the relative rotation of said their abutment members, when said projection is brought into said recess, said pair of abutment members being forcibly turned, by the biasing force of said bias means, to a neutral position side where central areas of said projection and recess in a circumferential direction of said abutment members are generally coincident with each other;

said hinge assembly being characterized in that when said pair of abutment members are turned into the neutral position, said projection being brought into contact with said recess at opposite side portions in a circumferential direction of said abutment member at a same time; and wherein an outer surface of said projection is defined by a first convex arcuate surface and opposite side surfaces of said recess in the circumferential direction of said abutment member, which are brought into contact with said projection at a same time, are defined by a second convex arcuate surface.

* * * * *